(12) United States Patent
Kawai et al.

(10) Patent No.: US 7,043,196 B1
(45) Date of Patent: May 9, 2006

(54) METHOD AND APPARATUS FOR TRANSMITTING DATA

(75) Inventors: Nobuyuki Kawai, Chofu (JP); Hok Shuen Wong, Guildford (GB); Michael John McTiffin, Winchester (GB); David Randall, Romsey (GB)

(73) Assignee: Inmarsat Ltd., London (GB)

( * ) Notice: Subject to any disclaimer, the term of this patent is extended or adjusted under 35 U.S.C. 154(b) by 400 days.

(21) Appl. No.: 08/904,312

(22) Filed: Jul. 31, 1997

(30) Foreign Application Priority Data

Jul. 31, 1996 (GB) .................................... 9616042

(51) Int. Cl.
*H04B 7/185* (2006.01)

(52) U.S. Cl. .................... 455/12.1; 455/456.1; 714/748

(58) Field of Classification Search ............... 455/12.1, 455/517, 435, 432; 370/394, 428, 473, 474, 370/475; 714/748, 749, 747, 746, 751, 456.1
See application file for complete search history.

(56) References Cited

U.S. PATENT DOCUMENTS

| | | | |
|---|---|---|---|
| 4,439,859 A | 3/1984 | Donnan | |
| 4,841,526 A | 6/1989 | Wilson et al. | |
| 4,888,767 A | 12/1989 | Furuya et al. | |
| 4,901,313 A | 2/1990 | Fujikura et al. | |
| 4,985,895 A | 1/1991 | Pelkey | |
| 4,995,076 A | 2/1991 | Joffe et al. | |
| 5,121,391 A | 6/1992 | Paneth et al. | |
| 5,303,286 A * | 4/1994 | Wiedeman .................. | 455/12.1 |
| 5,487,068 A * | 1/1996 | Smolinske et al. .......... | 371/748 |
| 5,497,371 A * | 3/1996 | Ellis et al. ................... | 370/394 |
| 5,754,754 A | 5/1998 | Dudley et al. | |

FOREIGN PATENT DOCUMENTS

| | | |
|---|---|---|
| EP | 0 319 271 A2 | 6/1989 |
| EP | 0330223 A2 | 8/1989 |
| EP | 0411538 A2 | 2/1991 |
| EP | 0 749 225 A2 | 12/1996 |
| GB | 2 250 897 A | 6/1992 |
| GB | 2287383 A | 9/1995 |
| GB | 2 310 117 A | 8/1997 |
| WO | 96/22641 A2 | 7/1996 |

OTHER PUBLICATIONS

Spragins et al., Telecommunications Protocols and Design, Addison-Wesley Publishing Company, pp. 316-321, 328-329, Jul., 1992.*

* cited by examiner

*Primary Examiner*—Lee Nguyen
(74) *Attorney, Agent, or Firm*—Banner Witcoff, Ltd.

(57) ABSTRACT

Data relating to the status of users 12 in a mobile communications system is broadcast via satellite 8 from a network register 4 to local registers 10 in an HDLC format. Each of the local registers 10 requests retransmission of any HDLC frames which are incorrectly received. The network register 4 records the earliest transmitted frame not yet acknowledged by all of the local registers and inhibits transmission of new frames if they fall outside a transmission window relative to the earliest transmitted frame. The network register 4 polls the local registers 10 for retransmission requests and the local registers 10 also send unsolicited requests to the network register 4. The network register 4 only retransmits a frame once if multiple requests for that frame are transmitted within a predetermined period. When a new local register 10 enters the broadcast reception group, the network register 4 informs the new local register 10 which new frame will next be transmitted. The number of bits used for frame sequence numbers is greater than that defined in the HDLC protocols.

10 Claims, 5 Drawing Sheets

METHOD AND APPARATUS FOR TRANSMITTING DATA

The present invention relates to a method and apparatus for transmitting data, and particularly but not exclusively to a method and apparatus for updating a plurality of location registers from a central location register.

In a mobile communication system, it is necessary to maintain a database of mobile users, including information on their last known locations so that calls may be routed to them efficiently. For example, in the GSM terrestrial cellular system, the location information is stored in a home location register (HLR) which is updated as a mobile terminal moves from one area to another. In addition, location information is stored in a visitor location register (VLR) associated with each mobile switching centre (MSC). The VLR duplicates parts of the information in the HLR and allows the MSC to obtain relevant information without contacting the HLR.

In the Inmarsat™ mobile satellite communication system, signals are relayed via geostationary satellites which have a large coverage area, known as an ocean region. It has hitherto been necessary for a calling party to know in which ocean region the called party is located. The calling party calls a different number depending on which ocean region is being called.

However, as the number of regions served by a satellite communication system increases, it becomes difficult for the calling party to determine in which region the called party is located.

The document U.S. Pat. No. 5,303,286 discloses a combined satellite and terrestrial cellular communication system which has a database of roaming users in the satellite service area. Changes to this database are communicated to terrestrial cellular user databases and satellite databases, so that these other databases can be updated accordingly. The database update information is communicated over a packet switched network to the terrestrial cellular databases and via a satellite uplink to the satellite.

According to the present invention, there is provided an apparatus and a method for propagating data on the status of user terminals in a mobile communication system from a central register to a plurality of local registers, in which the status data is broadcast over a common channel from the central register to all of the local registers and return channels are provided from each of the local registers to the central register through which error correction request signals can be sent. In this way, information which is needed by all of the local registers can be transmitted efficiently, while overcoming any errors involved in receiving the broadcast.

Preferably, the error correction request signals are selective request signals which request correction of only selected portions of the broadcast information which were received with errors. While this system is inherently more complicated than other error correction systems, such as go-back-N, it allows a high broadcast throughput for a given permissible bit error rate.

Preferably, the central location register may, for a predetermined period after transmission of correction information, prevent retransmission of the same information so as to avoid unnecessary repetition when requests for the same correction information are received from different local registers with different timings.

Advantageously, the information may be broadcast via a satellite.

According to another aspect of the present invention, there is provided a method and apparatus for point-to-multipoint communication using HDLC protocols, in which a non-standard control word format is used. A broadcasting station sends only the frame send sequence number, while each receiving station returns only the frame receive sequence number to the broadcasting station. Extended frame sequence numbering is provided, so that a greater number of bits is used for frame sequence numbering than is defined in the HDLC protocols. Preferably, eleven bits are used to specify the frame sequence numbering.

According to another aspect of the present invention, there is provided a method and apparatus for point-to-multipoint communications, in which each receiving station periodically sends unsolicited responses to the broadcast station so as to inform the broadcast station of any errors in the received data and of the last frame received in a consecutive sequence. In this way, more efficient use may be made of the return channel or channels.

According to another aspect of the present invention, there is provided a point-to-multipoint communication system, in which each receiving station is able to send retransmission requests relating to data previously broadcast by the broadcast station. On receipt of a retransmission request, the broadcast station only retransmits the requested data if it has not previously been transmitted within a predetermined period of time.

According to another aspect of the present invention, there is provided a point-to-multipoint communication system using HDLC protocols, in which a lower window variable is updated past a frame number only when all of the receiving stations have acknowledged receipt of that frame number.

According to another aspect of the present invention, there is provided a method and apparatus for point-to-multipoint communications using an HDLC protocol, in which a receive station may be added to a group of receive stations during a point-to-multipoint communication. The transmit station sends a current transmit sequence frame number to the new receive station and the receive station stores that sequence number as the start frame sequence number. In this way, receive stations may be added to a point-to-multipoint transmission without affecting the frame sequence numbering of receiving stations already taking part in the transmission.

The above point-to-multipoint communication systems are advantageously applied for transmitting user status data from a central user database to local user databases in a mobile communication system. Preferably, the information is broadcast from the transmit station to the receive stations via satellite.

Specific embodiments of the present invention will now be described with reference to the accompanying drawings in which:—

Figure 1:
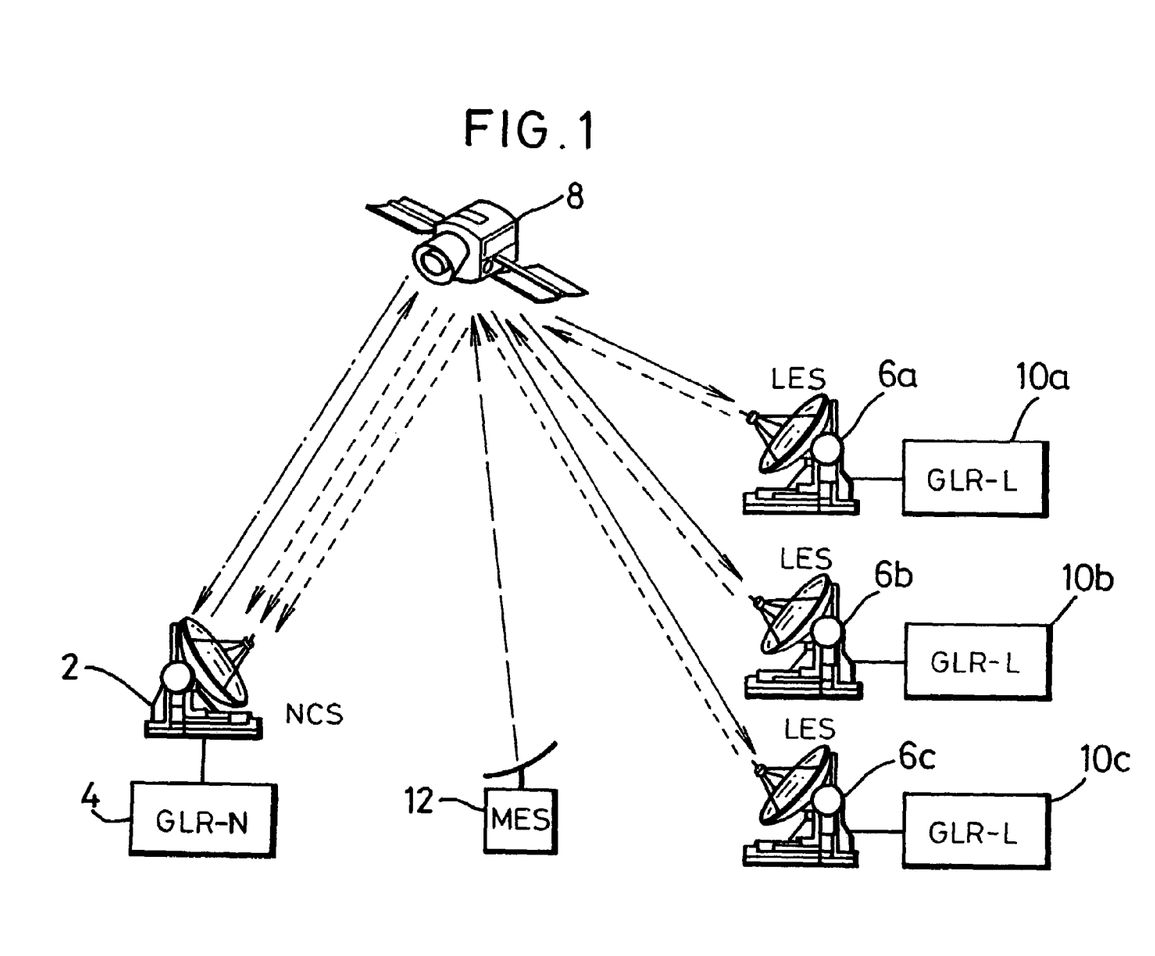
FIG. 1 is schematic diagram showing a point-to-multipoint communication between a network location register and a plurality of LES location registers in a satellite communication system according to an embodiment of the present invention.

As shown in FIG. 1, a network control station (NCS) 2 is connected to a network global location register (GLR-N) 4, which stores information relating to the current location of mobile users logged on to a mobile satellite communication system. The network control station communicates with a plurality of land earth stations (LES) 6a, 6b, 6c via a satellite 8. The satellite may, for example, be an Inmarsat-3 geostationary satellite.

Associated with each LES 6 is a corresponding LES global location register (GLR-L) 10. Each GLR-L 10 comprises a database which stores a copy of the data stored in the GLR-N 4.

A mobile earth station (MES) 12 is located within the coverage area of the satellite 8. When the MES 12 is switched on, it sends a log-on signal which is received by the satellite 8 and relayed to the NCS 2. The NSC 2 then registers log-on information in the GLR-N 4, comprising the identity of the MES 12 and a time stamp registering the log-on time. Each GLR-L 10 holds a copy of all the log-on information stored in the GLR-N 4. Any changes to the contents of the GLR-N 4 are communicated to all of the LESs 6 so that calls routed through any LES 6 to an MES may be sent via the satellite 8 if the MES 12 is in the corresponding ocean region, or routed to other LESs (not shown) serving other ocean regions, according to the location information for that MES stored in the GLR-L 10.

Figure 2:
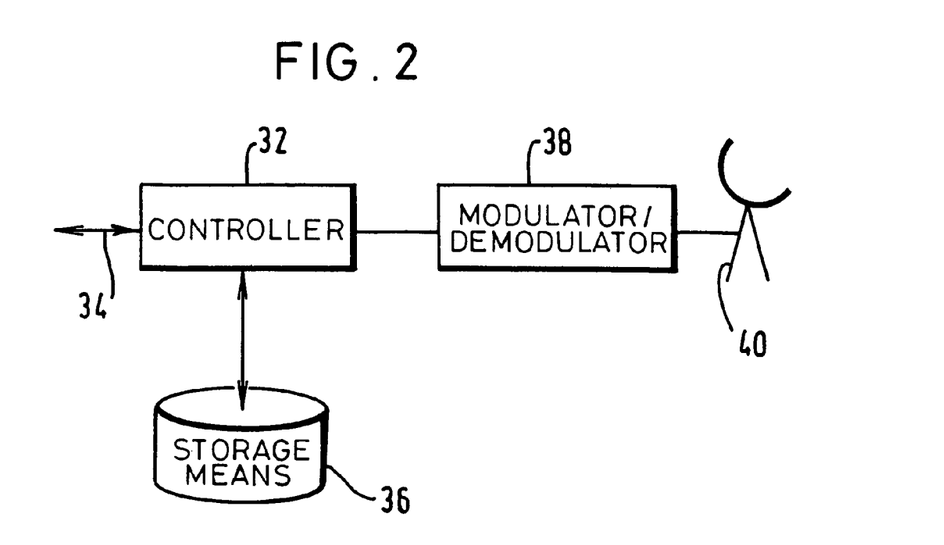
FIG. 2 is a more detailed schematic diagram of the network location register and control station of FIG. 1.

An example of the arrangement of the GLR-N 4 and the NCS 2 is shown in FIG. 2. An NCS controller 32 is connected to a storage means 36 for storing the GLR-N database. The storage means may comprise one or more hard disc drives, and/or random access memory.

The NCS controller 32 sends signals to and receives signals from an RF modulator/demodulator 38 connected to an antenna 40 directed towards the satellite 8.

The NCS controller 32 is connected by a terrestrial link 34 to a network operations centre (NOC, not shown) and to other NCS controllers of other NCSs, one of which is provided for each ocean region.

Thus, MES status information from MESs in the corresponding ocean region is obtained by the NCS controller 32 from the RF modulator/demodulator 38 as MESs log onto the NCS 2, and status information on MESs from other ocean regions is received from the terrestrial link 34. The NOC coordinates channel assignments between the ocean regions.

Figure 3:
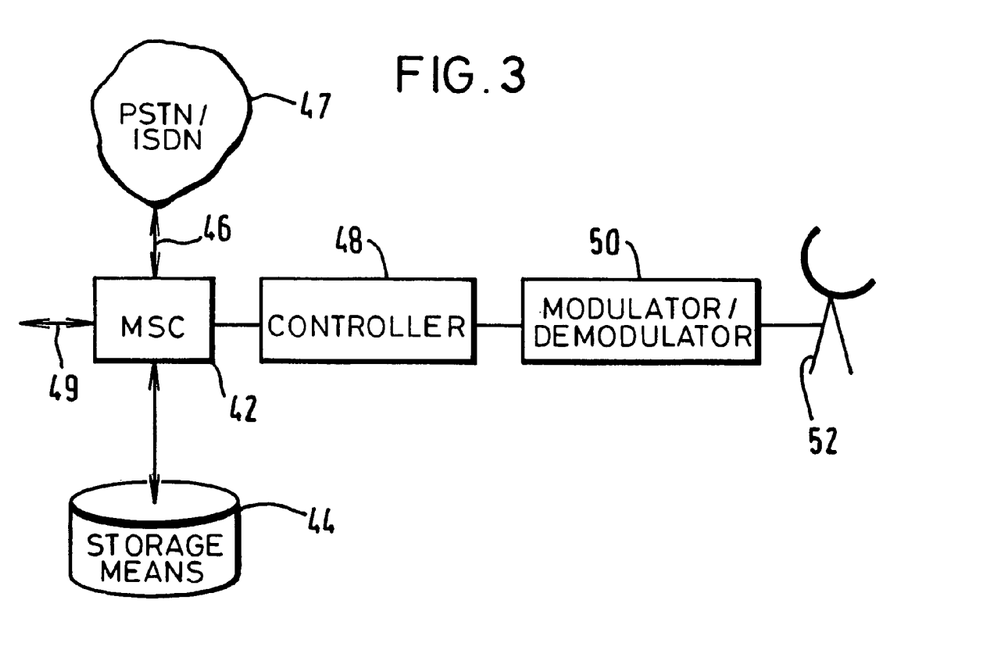
FIG. 3 is a more detailed schematic diagram of one of the LESs and its associated location register of FIG. 1.

An example of the arrangement of one of the LESs 6 and its associated GLR-L 10 is shown in FIG. 3. A mobile switching centre (MSC) 42 is connected to a terrestrial link 46, which may be connected to a public service telephone network (PSTN) 47, an integrated services digital network (ISDN) or other network. The MSC 42 is also connected via a further terrestrial link to other MSCs of other LESs, to allow calls to be routed to other LESs either in the same or in a different ocean region.

The MSC 42 derives the correct routing for a call from the PSTN 47 from a storage means 44, which stores the GLR-L database. Calls routed to the corresponding LES 6 are connected to an LES controller 48 which communicates via an RF modulator/demodulator 50, an antenna 52 and the satellite 8 to the called MES.

In order for this routing to work effectively, the contents of each GLR-L 10 should be accurate and up-to-date and therefore the changes to the contents of the GLR-N 4 should be communicated substantially without errors to each GLR-L 10. Protocols by which this is achieved will now be described.

Channel Types

For communication of MES information from the NCS 2 to each LES 6, a broadcast channel is used. The broadcast channel may be time division multiplexed with other channels. Data is broadcast in an HDLC format conforming generally to ISO standards ISO/IEC 3309, ISO/IEC 4335 and ISO/IEC 7809. Within ISO/IEC 7809, options 3 (single frame retransmission), 4 (unnumbered information), and 8 (command I frames only) are adopted. The NCS 2 acts as the primary station and the LESs 6 act as secondary stations.

In the transmission link, the HDLC frames are not aligned with the TDM slots but are packed contiguously into the TDM slots as a continuous bit pipe.

HDLC frames containing messages from each of the LESs 6 to the NCS 2 occupy a corresponding slot of a TDMA frame of a return channel so that each LES 6 has an individual slot assigned to it.

HDLC Messages

Both data and commands are transmitted by the GLR-N 4 but only responses are transmitted by each GLR-L 10 and no MES information is sent in the return direction.

The I (Information) frames transmitted by the GLR-N 4 include a sixteen bit control field and an eleven octet information field.

As defined in standard ISO/IEC 7809, option 10, (extended sequence numbering), the control field of the information frame has the format shown below in Table 1.

TABLE 1

Standard Control Field Format for Information Frames

| Bits | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Contents | 0 | | | | N(S) | | | | P/F | | | | N(R) | | | |

The variable N(S) is the serial number of the transmitted Information frame and the variable N(R) is the serial number of the next frame expected to be received in sequence by the transmitting station. Thus, if a frame with N(S)=3 is received by a station after a frame with N(S)=1, but no frame with N(S)=2 has yet been received, N(R) for the frames transmitted by that station will remain at 2 until a frame with N(S)=2 is received, in which case N(R) will be updated to 4. At each station there is stored a send state variable V(S), which corresponds to the sequence number of the next frame to be transmitted, and a receive state variable V(R), which determines the current value of N(R).

In the above standard frame numbering system, seven bits are provided for representing N(S) and N(R) and therefore the frame numbers are modulo 128. For each station, a window size K is defined. A transmitting station will cease to transmit new frames if the current transmit state variable V(S) is more than K greater than the N(R) of the last received frame. Therefore K defines the maximum number of unacknowledged frames which may be sent. With the standard 7-bit numbering system, the maximum value for K is 63 (half the maximum frame number) to avoid confusing the reception of a new frame with the reception of a retransmitted frame from a previous modulo 128 cycle.

The HDLC frame numbering system is specially adapted for the system according to the embodiment of the present invention. The GLR-N 4 stores an acknowledge state variable $V(A)_x$ corresponding to the last frame acknowledged by each GLR-L $10_x$. For example $$V(A)_x = N(R)_x - 1$$

where $N(R)_x$ is the latest N(R) received from GLR-L $10_x$. The GLR-N 4 also stores a lowest acknowledge state variable V(A) corresponding to the lowest acknowledge state variable $V(A)_x$ of any GLR-L $10_x$ which has established a link to the GLR-N 4.

i.e. $V(A) = MIN (V(A)_x)$

The GLR-N 4 stores a transmit state variable V(S) which defines the sequence number of the next frame to be transmitted. A transmit window is defined by the variables V(S), V(A) and K, the window size, such that new I frames will only be transmitted if $$V(S) \leq V(A) + K.$$

The GLR-N 4 is therefore limited in the number of new I frames which can be transmitted by the performance of the poorest quality link to any of the GLR-L 10.

Therefore, any GLR-L 10 is disconnected if the GLR-N 4 does not receive any frames from it within a predetermined period. Disconnection is performed by the GLR-N 4 transmitting a DISC command addressed to the relevant GLR-L 10. If a maximum window size of 63 is used, and a typical I-frame transmission rate of 11 per second, the maximum window will be exhausted after 2.8 seconds. Thus, any GLR-L 10 would be disconnected if it does not acknowledge within a 2.8 second period. This would lead to an unacceptably high rate of disconnection.

In order to overcome this problem, the I frame sent from the GLR-N 4 to each GLR-L 10 in the broadcast channel has the format shown below in Table 2.

TABLE 2

Control Field Format for Information Frames

| Bits | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|
| Contents | 0 | SPARE | | | | | | | | | N(S) | | | | | |

The variable N(S) is the serial number of the Information frame. The variable N(R) is omitted, since no information is sent from each GLR-L 10 to the GLR-N 4 and it is therefore not necessary for the GLR-N 4 to broadcast N(R). The transmit sequence number N(S) is represented by 11 bits, giving a maximum window size of 1023. Therefore, at a transmission rate of 11 I frames per second, the maximum window size will be used up in 46.5 seconds. This allows sufficient time for a link to any GLR-L 10 to be reestablished in the event of failure.

The I frame information contents include an MES identity code identifying a specific MES, and location and status information for that MES.

The format of the control field in RR frames transmitted by any GLR-L 10 are shown below in Table 3.

TABLE 3

Control Field Format for RR Frames

| Bits | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|
| Content | 1 | 0 | 0 | 0 | F | | | | | | N(R) | | | | | |

N(S) is omitted from the control field, since no data is transmitted by GLR-L 10. Instead, an 11 bit receive sequence number N(R) is used. This enables a maximum window size of 1023 as described above. The significance of the final bit F will be discussed in the next section.

Selective Request

The forward link is susceptible to noise both in the uplink from the NCS 2 to the satellite 8 and each downlink from the satellite 8 to each LES 6. Uplink noise will affect the quality of all the downlinks equally, whereas downlink noise only affects the relevant downlink. Therefore, some transmission errors will be common to all the LES 6, while some will be specific to one or more LES 6. An error correction protocol is used which maximises the broadcast throughput for a given bit error rate under these conditions.

Figure 4:
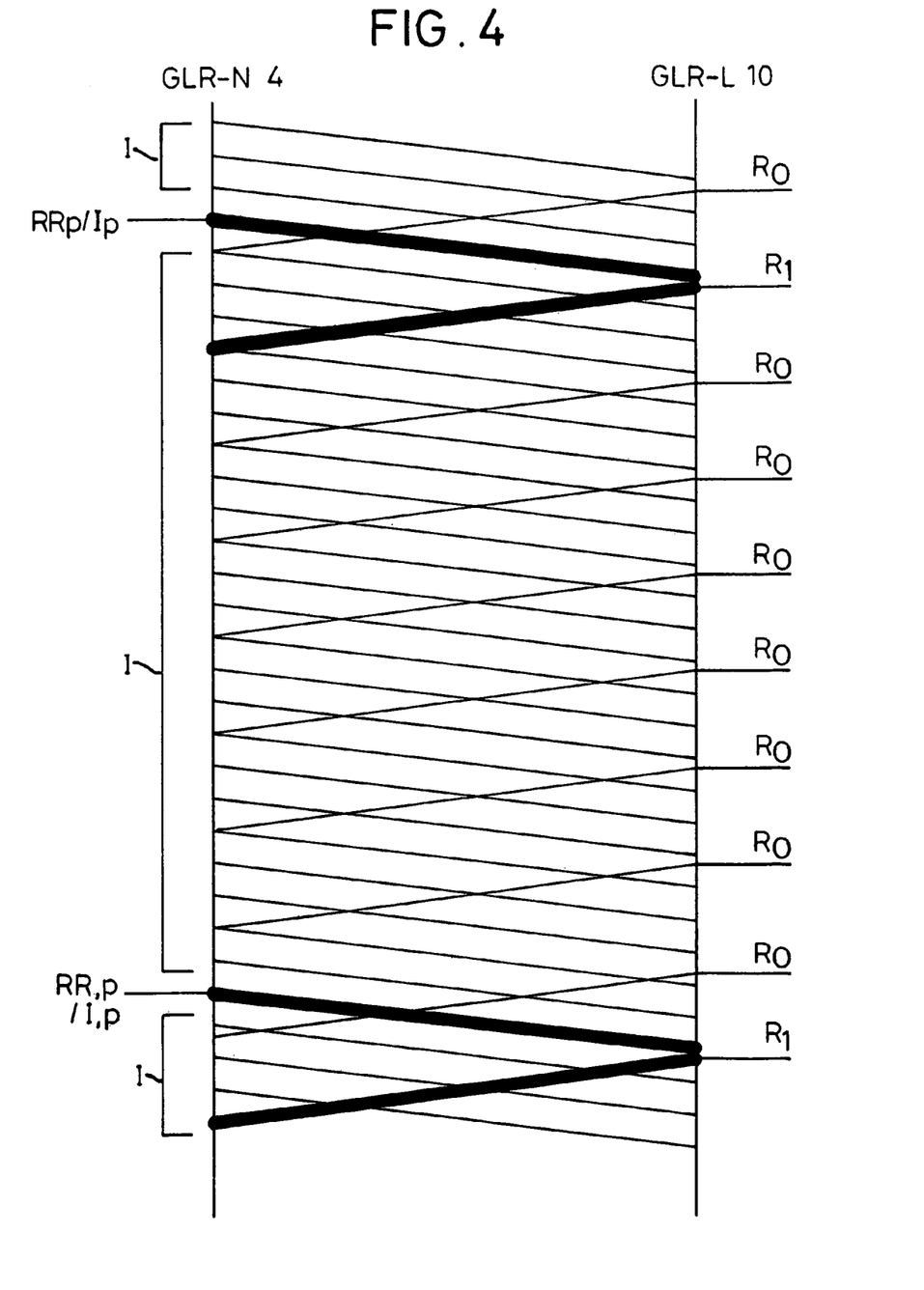
FIG. 4 is a protocol diagram showing a communication between the network location register and one of the LES location registers of FIG. 1.

FIG. 4 shows a protocol exchange between the GLR-N 4 and one of the GLR-L 10. The GLR-N 4 sends a series of information frames I to the GLR-L 10 over the broadcast channel. Periodically, the GLR-L 10 responds with a response signal $R_0$, which may be a receive ready (RR) frame or a selective request frame (SREJ). The RR frame indicates that no retransmission of frames is needed, while the SREJ frames specifies which information frames should be repeated.

Periodically, the GLR-N 4 sends an RR or I frame with the poll bit P set, shown in bold in FIG. 4. The GLR-L 10 responds with a frame $R_1$, which is either an RR or SREJ frame, with the final bit F set. The polling by the GLR-N 4 is provided in addition to the unsolicited response $R_0$ by the GLR-L 10. This enables the system to recover from failure by the GLR-N 4 to receive periodic unsolicited SREJ frames from any GLR-L 10 and failure by the GLR-L 10 to receive retransmitted I frames.

Figure 5:
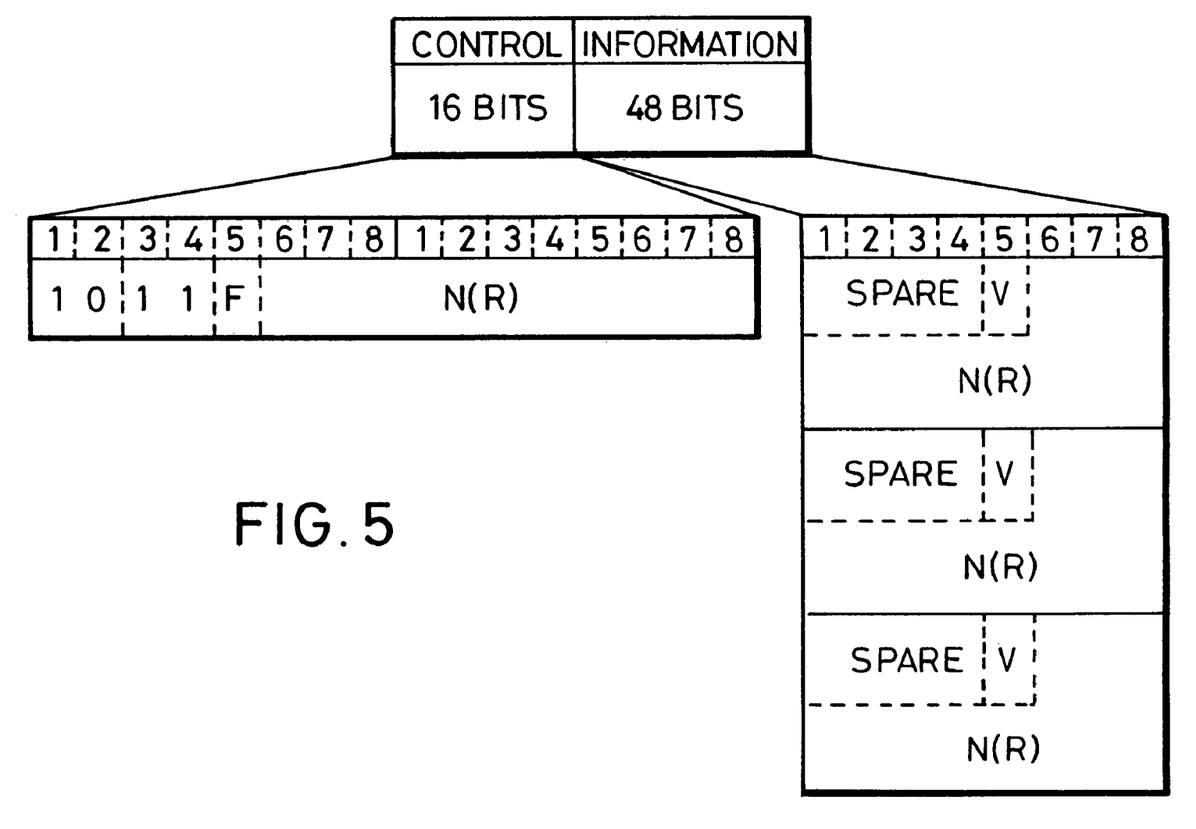
FIG. 5 is a diagram of the contents of an SREJ frame in the protocol exchange shown in FIG. 1.

The content of the information field of an SREJ frame from the GLR-L 10 to the GLR-N 4 is shown in FIG. 5.

The information field is 48 bits long and can hold up to four receive sequence numbers N(R). The first N(R) is located in the control field, while the remaining three N(R) are located in the information field. Each receive sequence number N(R) indicates a frame number which has not been received. The validity bit V indicates whether the following N(R) is valid, so that less than 4 frames can be indicated, with the validity bit V set to zero for the N(R) fields which are not used.

If the GLR-L 10 requires retransmission of more than 4 frames, the current four lowest-numbered frames which have not yet been received correctly are requested.

Since the number of bits available in the SREJ frame is limited by the TDMA slot length, there is a trade-off between the number of bits used to represent frame sequence numbers N(S) and N(R) and the number of receive sequence numbers N(R) which can be fitted into SREJ frame. Increasing the number of bits used to represent frame numbers increases the maximum window size, but reduces the number of frames which can be requested in a SREJ frame. An 11-bit sequence number provides a balance which is suited to the noise characteristics of the system shown in FIG. 1.

Retransmission

After receipt of an SREJ, the GLR-N 4 determines whether each of the requested frames has previously been scheduled for retransmission within a predetermined preceding period T3. If the frame has not been scheduled for retransmission within that preceding period, that frame is scheduled for retransmission and is duly retransmitted by the GLR-N 4 after any other frames with higher priority have been transmitted.

If the frame number of a frame requested for retransmission is not within the current transmit window (V(A) to V(A)+K) the request is ignored.

Since some of the information frames I are likely to be incorrectly received by more than one GLR-L 10, there may be multiple retransmission requests for the same information frame from different GLR-L 10, at varying times due to lack of synchronisation between the different GLR-L 10. The period T3 is set so that multiple requests for retransmission of the same frame will all be received within the period T3. In this way, unnecessary repeat retransmissions are avoided.

Alternatively, the GLR-N 4 stores the sequence numbers of all requested frames within the period T3 and at the end of the period schedules all the requested frames for retransmission. All the requested frames are transmitted only once in response to requests received during the period T3, regardless of how many times they are requested.

Link Recovery

When a new GLR-L 10 enters into service, or an existing GLR-L 10 recovers after a disconnection communication failure or a system crash, it is necessary to reestablish a data link between that GLR-L 10 and the GLR-N 4. In a standard HDLC protocol, the send and receive state variables V(S) and V(R) of each station are set to zero when establishing a data link. However, in a point-to-multipoint system as shown in FIG. 1, this would require all the other GLR-L 10 to reset their state variable V(R) as well.

Figure 6:
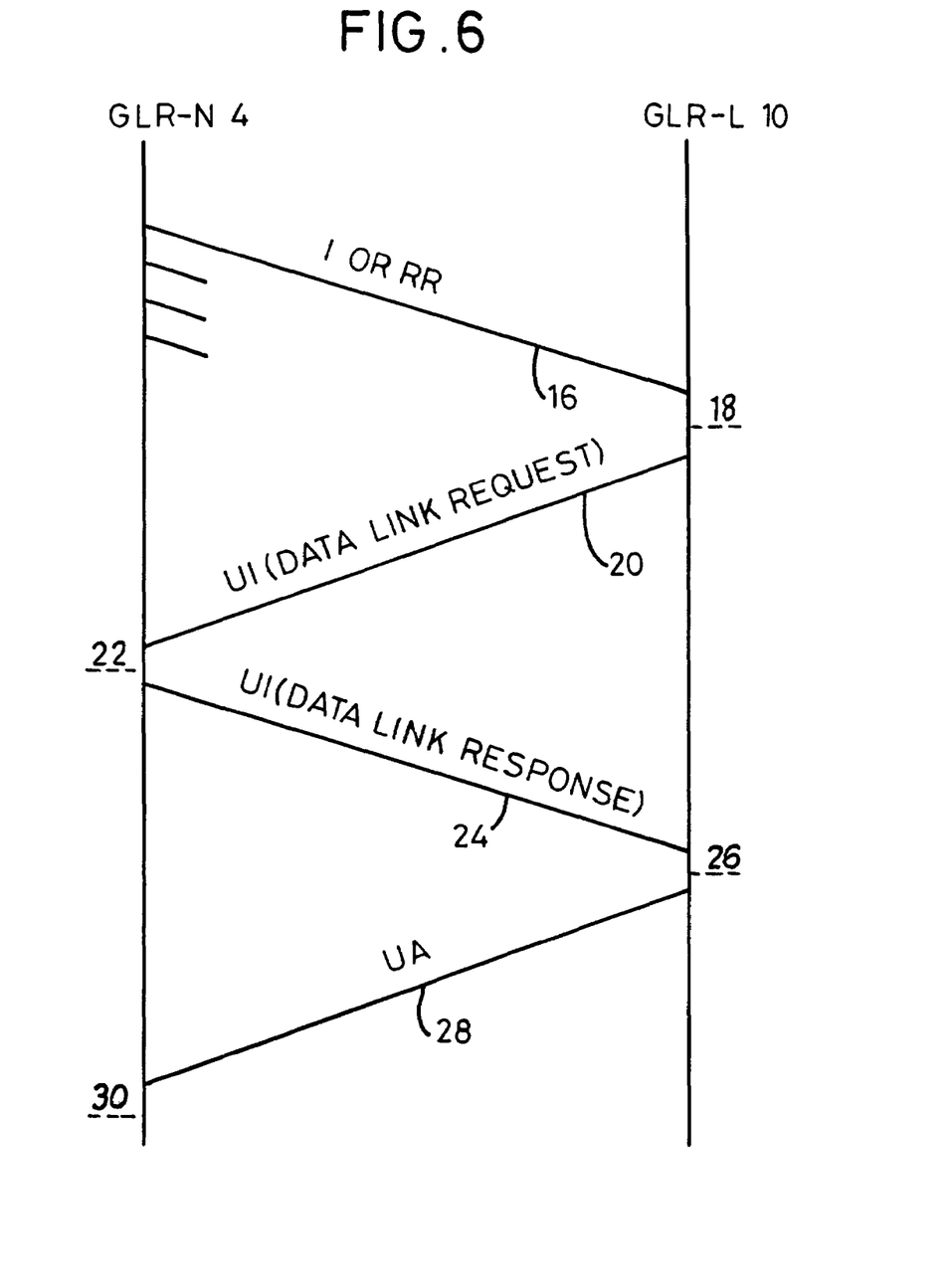
FIG. 6 is a protocol diagram showing link set-up procedure between the network location register and a new LES location register.

In the present system, an alternative protocol is used to connect or reconnect a GLR-L 10 to the GLR-N 4, as shown in FIG. 6. The GLR-N 4 broadcasts information I or receive ready RR frames to all the GLR-L 10 (step 16). The GLR-L 10 initiates establishment of a data link (step 18) and sends an unnumbered information (UI) frame indicating that a data link is requested (step 20).

If the GLR-N 4 receives the data link request 20, it outputs its current send state variable V(S) in an unnumbered information (UI) frame, which is transmitted as a data link response at step 24. At step 26, the GLR-L 10 receives the data link response and sets its receive state variable V(R) as the current send state variable V(S) received in the data link response 24. At step 28, the GLR-L 10 sends an unnumbered acknowledged (UA) signal, which is received by the GLR-N 4 at step 30 and the link set-up is complete. Thereafter, the GLR-N 4 stores an acknowledge state variable $V(A)_x$ for that GLR-L 10.

At each transmission, the transmitting station sets a timer. If an expected response is not received, the transmitting station retransmits the signal after a period T1, but terminates the procedure if no response is received after N2 repetitions of the signal.

Embodiments of the present invention use a point-to-multipoint transmission system to broadcast information relating to status of user terminals in a mobile satellite system. However, it will readily be appreciated that aspects of the invention may be applied to any other mobile communication system, whether using satellite or terrestrial cellular links, in which it is necessary to update multiple copies of a database of the status of users, such as the GSM system.

Furthermore, embodiments of the present invention provide advantageous protocols for implementing a point-to-multipoint transmission system. Aspects of the present invention may therefore be applied in other contexts than the transmission of mobile user status information, and can be applied to many other types of point-to-multipoint transmission system, particularly wireless transmission systems which are susceptible to noise.

References to mobile user terminals will be understood to include wireless terminals which are not in fact mobile, by reason of being installed in temporary or permanent immobile installations.

The invention claimed is:

1. Apparatus for broadcasting data to a plurality of data receiving stations, comprising:
   means for broadcasting said data in a common channel receivable by each of said receiving stations in a format comprising a plurality of frames;
   means for receiving error correction request signals indicating selected ones of said frames from each of said receiving stations; and
   means for rebroadcasting said selected frames to each of said receiving stations in response to said error correction request signals; wherein said means for rebroadcasting is operable, if a plural number of said error correction request signals indicating the same selected frame are received within a predetermined period, to rebroadcast said same selected frame less than said plural number of times said error correction request signals indicating the same selected frame are received within the predetermined period of time.

2. Apparatus as claimed in claim 1, wherein said means for retransmitting is operable to retransmit each selected frame only if said selected frame has not previously been transmitted within said predetermined period.

3. A method of broadcasting data to a plurality of data receiving stations, comprising:
   broadcasting said data in a common channel receivable by each of said receiving stations in a format comprising a plurality of frames, receiving error correction request signals indicating selected ones of said frames from one or more of said receiving stations, and rebroadcasting said selected frames to said receiving stations; wherein, if a plural number of said error correction request signals indicating the same selected frame are received within a predetermined period, the step of retransmitting said selected frames comprises rebroadcasting said same selected frame less than said plural number of times said error correction request signals indicating the same selected frame are received within the predetermined period of time.

4. A method as claimed in claim 3, wherein said retransmitting step comprises retransmitting each selected frame only if that selected frame has not previously been transmitted within said predetermined period.

5. Apparatus for broadcasting data to a plurality of data receiving stations, comprising:
- means for broadcasting said data in a common channel receivable by each of said receiving stations in a format comprising a plurality of frames;
- means for receiving error correction request signals indicating selected ones of said frames from each of said receiving stations;
- means for broadcasting said selected frames to each of said receiving stations in response to said error correction request signals and means for receiving from each of said receiving stations acknowledgment signals indicating the earliest of said frames which has not been received by that station, wherein the means for broadcasting is operable to broadcast a new frame which has not been previously broadcast only if a sequential order of said new frame is not greater than a sequence order of the earliest of said frames which has been indicated to not have been received by any one of said receiving stations by a predetermined number.

6. Apparatus as claimed in any one of claim 5 wherein the data is broadcast from a satellite.

7. Apparatus as claimed in any one of claim 5 wherein the data relates to the status of user terminals in a mobile communications system and each of the receiving stations has associated therewith a database for storing said data.

8. A method of broadcasting data to a plurality of data receiving stations, comprising:
- broadcasting said data in a common channel receivable by each of said receiving stations in a format comprising a plurality of frames;
- receiving error correction request signals indicating selected ones of said frames from one or more of said receiving stations;
- rebroadcasting said selected frames to said receiving stations; and receiving from each of said receiving stations acknowledgment signals indicating the earliest in sequence of said frames which has not been received by that local station, wherein a new frame which has not previously been broadcast is broadcast only if a sequential order of said new frame is not greater than a sequence order of the earliest of said frames which has been indicated to have not been received by any one of said local stations by a predetermined number.

9. A method as claimed in any one of claim 8 wherein the data is broadcast via satellite.

10. A method as claimed in any one of the claim 8, wherein the data relates to the status of user terminals in a mobile communications system and each of the receiving stations has associated therewith a database for storing said data.

* * * * *